Patented Dec. 7, 1937

2,101,118

UNITED STATES PATENT OFFICE 2,101,118

ALUMINUM ALLOY

Henry L. Whitman, Los Angeles, Calif.

No Drawing. Application August 26, 1936,
Serial No. 98,076

2 Claims. (Cl. 75—140)

This invention relates to an aluminum alloy with aluminum and certain ingredients added which are very active in the producing of alloys.

The objects of this invention are to provide an aluminum alloy of superior texture for use as a metal itself and also such an alloy of a special advantage and use in other alloys.

First step or stage: To produce this aluminum alloy, first melt together in a crucible 5.31% copper, .88% nickel, 1.66% manganese. These elements are melted together because of their high melting points. They consequently very readily join together and make an alloy. This alloy can be cast into pig form and later combined with the proper percentage to make aluminum alloy, the same being united to aluminum in the molten stage.

Second step or stage: I melt in a separate crucible 88.23% aluminum. When it is thoroughly melted and fluid I add the result of the first stage, viz., copper, nickel, and manganese. It is preferable to add these in the molten state, although the pig form having been previously melted and alloyed may be used but it consumes unnecessary time in melting and mixing.

Third step or stage: After the first stage alloy has been melted in the aluminum and thoroughly combined, I add to the whole mass 2.65% of tin and .88% magnesium and thoroughly mix and combine the same together.

Fourth stage: After these metals and alloys of the first three stages have all been mixed together and thoroughly stirred, I add .39% silver, making the total of 100%.

I then stir and mix thoroughly. This metal is then cast into pig form. It pours into the pigs free from all dross or impurity and is ready for use as one of the elements in making copper, lead and tin bronzes. It is also a valuable metal alloy in itself.

The product, of course, is dominated by the aluminum and has a silvery luster when machined; the metals alloyed with the aluminum make it a very close grained metal of great strength when compared with aluminum and very resistant to corrosion.

I desire to claim the invention specifically and also broadly as pointed out in the appended claims.

Having thus described my invention, what I claim as new and desire to secure by Letters Patent is:

1. An aluminum alloy consisting of:

| | Percent |
|---|---|
| Aluminum | 88.23 |
| Copper | 5.31 |
| Tin | 2.65 |
| Nickel | .88 |
| Magnesium | .88 |
| Manganese | 1.66 |
| Silver | .39 |
| Total per cent | 100.00 |

2. An aluminum alloy consisting of from 85% to 90% aluminum, from 4% to 6% of copper, from 2% to 3% of tin, from ½% to 1% of nickel, from ½% to 1% of magnesium, from 1% to 2% of manganese, from ¼% to ½% of silver, the quantity being alloyed together to produce a complete product by fushion at high temperature.

HENRY L. WHITMAN.